United States Patent
Jansson et al.

(10) Patent No.: US 12,294,558 B2
(45) Date of Patent: *May 6, 2025

(54) INTEGRATION OF VOICE SERVICES WITH MESSAGING CONVERSATION SERVICES AT A SOFTWARE AS A SERVICE PLATFORM

(71) Applicant: Twilio Inc., San Francisco, CA (US)

(72) Inventors: Daniel Jansson, San Francisco, CA (US); Brandon Joel Hawkins, Lafayette, CA (US); Danny Weijian Qian, Milpitas, CA (US); Marc Devens, Jersey City, NJ (US); Dmytro Savin, Tallinn (EE)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,514

(22) Filed: Mar. 25, 2024

(65) Prior Publication Data

US 2024/0236020 A1  Jul. 11, 2024

Related U.S. Application Data

(63) Continuation of application No. 17/959,888, filed on Oct. 4, 2022, now Pat. No. 11,943,182.

(51) Int. Cl.
| | |
|---|---|
| *H04L 51/046* | (2022.01) |
| *H04L 51/216* | (2022.01) |
| *H04M 3/42* | (2006.01) |
| *H04M 7/00* | (2006.01) |

(52) U.S. Cl.
CPC .......... *H04L 51/046* (2013.01); *H04L 51/216* (2022.05); *H04M 3/42* (2013.01); *H04M 7/0054* (2013.01)

(58) Field of Classification Search
CPC ...... H04L 51/046; H04L 51/216; H04M 3/42; H04M 7/0054
USPC .......................................................... 709/226
See application file for complete search history.

(56) References Cited

U.S. PATENT DOCUMENTS

| | | | |
|---|---|---|---|
| 9,148,397 B2 | 9/2015 | Talwar et al. | |
| 9,210,110 B2* | 12/2015 | Maria | ............. H04L 51/066 |
| 9,444,775 B2* | 9/2016 | Kupsh | ................. H04L 51/10 |
| 10,033,669 B2* | 7/2018 | Odell | .................. H04L 51/48 |
| 10,257,146 B2 | 4/2019 | Talwar et al. | |
| 10,931,608 B2 | 2/2021 | Olivera et al. | |

(Continued)

*Primary Examiner* — Sargon N Nano
(74) *Attorney, Agent, or Firm* — Lowenstein Sandler LLP

(57) ABSTRACT

A software as a service (SaaS) platform sends, to an end user device, a message of a messaging conversation between the end user device and a first client device associated with a first user account of the SaaS platform. The message is associated with a first telephone number provisioned by the SaaS platform. The messaging conversation is associated with a messaging conversation identifier. The end user device is associated with a second telephone number. The first client device is associated with a third telephone number. a first request to place a voice call is received, via a first application programming interface (API) call from the first client device, based on the messaging conversation identifier. Responsive to receiving the first request, the voice call to the second telephone number is placed. The voice call is associated with the first telephone number provisioned by the SaaS platform.

20 Claims, 7 Drawing Sheets

(56) References Cited

U.S. PATENT DOCUMENTS

| | | |
|---|---|---|
| 10,999,337 B1 | 5/2021 | Ledet |
| 11,570,303 B2* | 1/2023 | Foley .................... H04M 7/006 |
| 2008/0096588 A1* | 4/2008 | Waytena ............. H04L 61/4535 |
| | | 709/206 |
| 2012/0177189 A1 | 7/2012 | Chatterjee et al. |
| 2014/0133639 A1 | 5/2014 | Berk |
| 2014/0369485 A1 | 12/2014 | Hollander et al. |
| 2016/0344866 A1* | 11/2016 | Lau ....................... H04L 51/224 |
| 2018/0227424 A1* | 8/2018 | Dorsey ............. H04M 3/53333 |
| 2019/0207899 A1* | 7/2019 | Menezes ................ H04L 51/42 |
| 2020/0366628 A1 | 11/2020 | Olivera et al. |
| 2023/0421519 A1* | 12/2023 | Savin ................... H04L 51/216 |

* cited by examiner

INTEGRATION OF VOICE SERVICES WITH MESSAGING CONVERSATION SERVICES AT A SOFTWARE AS A SERVICE PLATFORM

RELATED APPLICATION

This application is a continuation application to and claims the benefit of U.S. Non-Provisional application Ser. No. 17/959,888, filed Oct. 4, 2022, the entire contents of which are incorporated herein by reference.

TECHNICAL FIELD

Aspects and embodiments of the disclosure relate to computer networking, and more specifically, to systems and methods for integrating voice services with messaging services at a software as a service (SaaS) platform

RELATED APPLICATION

This application is a continuation application to and claims the benefit of U.S. Non-Provisional application Ser. No. 17/959,888, filed Oct. 4, 2022, the entire contents of which are incorporated herein by reference.

BACKGROUND

Instant messaging (IM) technology can include a type of online chat allowing real-time transmission of media content over the Internet or another computer network. Messages are typically transmitted between two or more parties, when each user inputs content and triggers a transmission to the recipient(s), who may be all connected on a common network or common application. Short Messaging Service (SMS) technology can include text messaging. An SMS message is often sent from one mobile device to another over the cellular network. Multimedia Messaging Service (MMS) technology can include a way to send messages that include multimedia content to and from a device, such as a mobile phone, over a cellular network.

Voice call technology can include voice calls over a public switched telephone network (PTSN) and voice over Internet Protocol (VoIP) to deliver voice communications and multimedia sessions over Internet Protocol (IP) networks.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
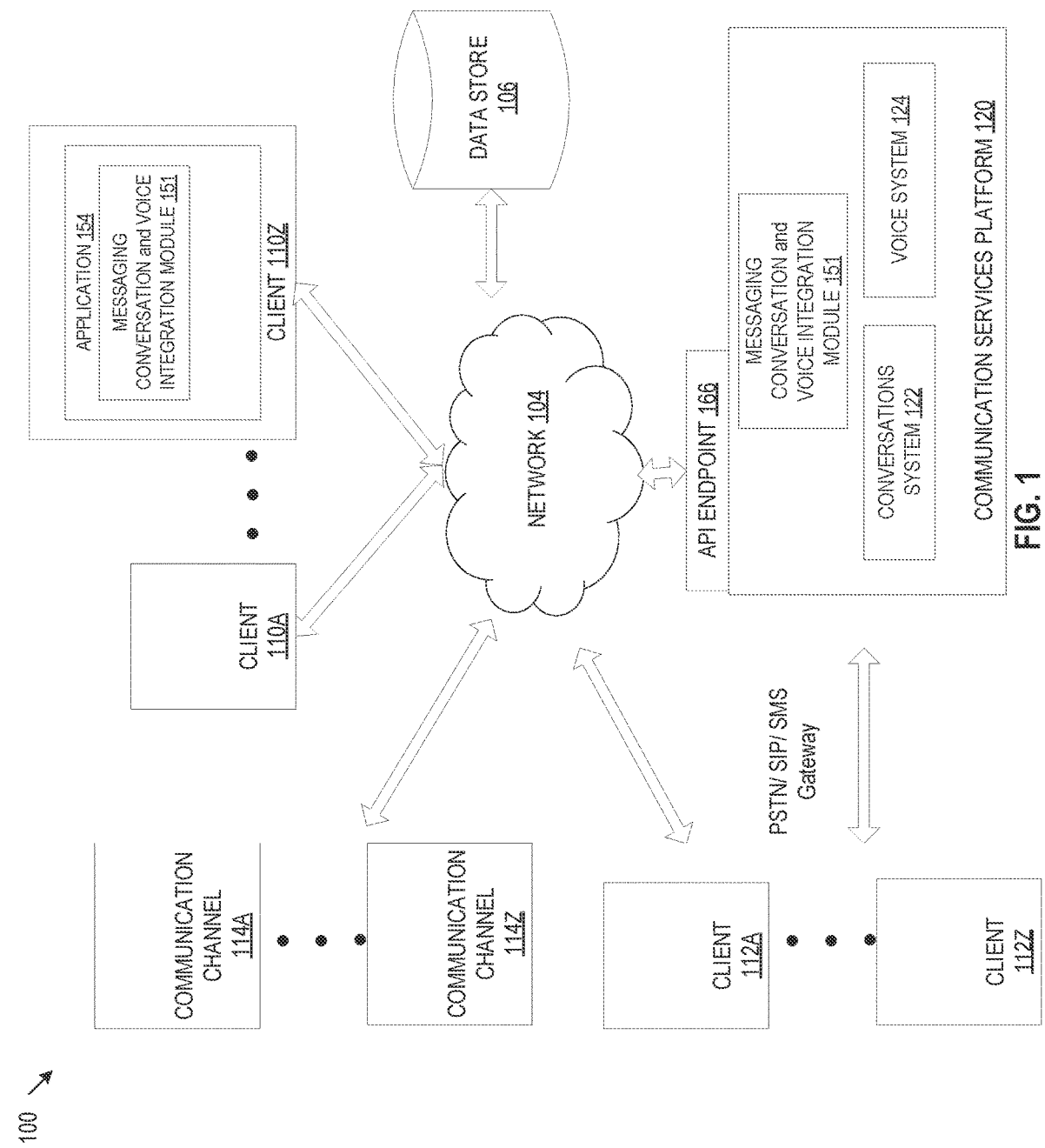
FIG. 1 illustrates an example system architecture, in accordance with some embodiments of the disclosure.

A communication services platform, such as a Software as a Service (SaaS) platform, can offer various communication services to users. For example, a SaaS platform can offer messaging service tools that facilitate messaging conversations, e.g., the sending and/or receiving of messages, such as SMS messages, MMS messages, and/or IM messages, to and from devices via various communication channels. A communication channel can refer to a form of communication that uses one or more of a particular protocol, a particular underlying technology or is provided by a particular entity (e.g., third-party entity). Different communication channels can refer to different forms of communication that can use one or more of different communication protocols, different underlying technologies (e.g., SMS vs IP), or are provided by different entities, such as a third-party entity, that offer services, software or hardware (or a combination thereof) through which messages can be exchanged between recipient devices. For instance, the SaaS platform may send a text message (e.g., SMS message) to a recipient device using a communication channel, such as a telecommunications carrier network or send an instant message to a recipient device using an IM communication channel (e.g., using an application programming interface (API) to communicate with the IM communication channel). Examples of channels can include Public Switched Telephone Network (PTSN) based channels such as SMS or MMS, Internet Protocol (IP) based channels, and proprietary channels (e.g., proprietary social media messaging applications).

In another example, the communication services offered by a SaaS platform can include voice services, such as routing inbound and outbound voice calls. In addition to routing voice calls, voice services can include transcription services, conference call services, recording services, interactive voice recognition (IVR) services, text-to-speech services, among others. For instance, the SaaS platform can provision telephone numbers to an organization (e.g., entity) and the provisioned telephone numbers can be assigned, often dynamically, to various user accounts of the organization. The organization may, via APIs, configure user-defined routing logic that can specify rules detailing how the SaaS platform is to route particular voice calls and/or execute particular voice services before, during, and/or after the voice calls.

Customers of the communications services offered by a SaaS platform may subscribe to a variety of different communication services, and in particular subscribe to both messaging services and voices services, and further desire that the requested communication services are provided as an integrated service where the user experience is seamless and cohesive when transferring between voice services and messaging services. However and in some cases, voice systems that offer voice services and message conversation systems that offer messaging services can be distinct communication systems that may not be interoperable, which can pose challenges in integrating the communication services and in providing a seamless user experience.

Aspects of the disclosure address the above-mentioned and other challenges by integrating user-configurable voice services and user-configurable messaging services that both can be can be accessed using a single application executing at the client device.

In some embodiments, a user of client device (e.g., customer of the SaaS platform) can exchange messages (e.g., SMS message) of a messaging conversation (also referred to as "messaging" herein) with an end user (e.g., customer's end user). The user of the client device may desire to place a call to the end user's device (e.g., outbound voice call) concurrently with the exchange of messages or even some time after the last message of the messaging conversation has been exchanged (e.g., days). In some embodiments, to provide enhanced security to sensitive data, such as telephone numbers, the telephone numbers of end users may not be provided to the client devices of the user (e.g., phones of the employees of the organization). Rather, the telephone numbers of end users can be stored at the communication services platform (e.g., SaaS platform) and associated with a particular messaging conversation to enhance security of the sensitive data.

In some embodiments, to place a call to an end user device associated with the end user, the client device can send an API request to the communication services platform to request placement of a voice call. The voice call request may identify a command (e.g., API command) requesting a voice call be placed. The voice call request may identify a messaging conversation identifier of the messaging conversation between the user of the client device and the end user. In some embodiments, the messaging conversation identifier can be a unique identifier, used by the communication services platform, to reference data (e.g., messaging conversation data, such as participants, telephone numbers, etc.) associated with the messaging conversation. A messaging conversation identifier can typically be associated with messaging services of a messaging conversation system, but can also be leveraged to integrate the voice services with messaging services. In some embodiments, the voice call request may not include the telephone number of the end user device (e.g., recipient telephone number) associated with the end user and/or may not explicitly identify which of the participants of the messaging conversation is the recipient of the voice call (e.g., end user).

In some embodiments, the communication services platform can use the messaging conversation identifier to obtain messaging conversation data related to the messaging conversation. The messaging conversation data can include identifiers of the participants of the messaging conversation. In some embodiments, the messaging conversation may have two or more participants. For instance, the messaging conversation may have been transferred among different users of the organization and even among one or more chat bots. In some embodiments, the communication services platform can perform a filtering operation to identify, among the multiple messaging conversation participants, a participant that is the voice call recipient. For example, communication services platform may filter out all the participants of a message conversation that are registered (e.g., associated with user accounts) at the communication services platform to identify the participant that is the voice call recipient.

In some embodiments, the identified participant of the messaging conversation (e.g., voice call recipient) can be associated with a telephone number, which is stored securely at the communication services platform. Communication services platform can retrieve the associated telephone number and place the voice call to the telephone number of the end user device and further connect the call to the client device without disclosing the telephone number of the end user device to the client device.

As noted, a technical problem addressed by embodiments of the disclosure is integrating a voice system offering voice services with a messaging conversation system offering messaging services while keeping sensitive data, such as telephone numbers, secure. Another technical problem addressed by the embodiments of the disclosure is the integration of voice services with messaging conversation services in a manner that provides a seamless and cohesive user experience.

A technical solution to the above-identified technical problem may include using a messaging conversation identifier associated with a messaging conversation to facilitate the integration of a voice services of a voice system with messaging services of a messaging conversation system. The messaging conversation identifier can be used to reference a messaging conversation and to obtain secured end user telephone numbers and identify participants of the messaging conversation from the corresponding messaging conversation data. Communication services platform can filter the participants to identify the recipient of the voice call and the corresponding recipient telephone number to which the voice call is to be placed.

Thus, the technical effect may include developing and modifying technical infrastructure that allows a voice system offering user-configurable voice services to be integrated with a messaging conversation system offering user-configurable messaging services and that protects sensitive information. Further, the technical effect may include providing a user-facing application to interface with the technical infrastructure and that allows for a user to seamlessly access both voice services and messaging services provided by the communication services platform.

FIG. 1 illustrates an example system architecture 100, in accordance with some embodiments of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information) with communication services platform 120. In some embodiments, application 154 can implement user interfaces (e.g., graphical user interfaces (GUIs)) that may be webpages rendered by a web browser and displayed on the client device 110Z in a web browser window. In another embodiment, the user interfaces of client application 154 may be included in a stand-alone application downloaded to the client device 110Z and natively running on the client device 110Z (also referred to as a "native application" or "native client application" herein).

In some embodiments, client devices 110 can communicate with communication services platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that are sent to the communication services platform 120 from the client device 110Z implementing application 154. In some embodiments, the communication services platform 120 can respond to the requests from the client device 110Z by using one or more API responses using an application layer protocol. Similarly, communication services platform 120 can communicate with one or more communication channels 114A-114Z using API function calls.

In some embodiments, one or more of client devices 110 can be identified by a uniform resource identifier (URI), such as a uniform resource locator (URL). For example, communication services platform 120 can send an API call to client device 110Z addressed to a URL specific to the client device 110Z. In some embodiments, the communication services platform 120 can be identified by a URI. For instance, the API call sent by a client device 110 to communication services platform 120 can be directed to the URL of communication services platform 120.

In some embodiments, the APIs used to access the conversations system 122 of the communication services platform 120 can be different from the APIs used to access the voice system 124 of communication services platform 120. In some embodiments, conversations system 122 and voice system 124 can communicate between one another using APIs. In some embodiments, the APIs used to communicate between conversations system 122 and voice system 124 may be private APIs that are not accessible by client devices 110 (or client devices 112).

In some embodiments, client devices 112A-112Z (generally referred to as "client device(s) 112" herein) may be similar to client devices 110. In some embodiments, client devices 112 can include one or more telephony devices. A telephony device can include a Public Switched Telephone Network (PSTN)—connected device, such as a landline phone, cellular phone, or satellite phone, for example. In some embodiments, a telephony device can also include an internet addressable voice device (e.g., non-PSTN telephony device), such as Voice-Over-Internet-Protocol (VOIP) phones, or Session Initiation Protocol (SIP) devices, for example. In some embodiments, a telephony device can include one or more messaging devices, such as a Short Message Service (SMS) network device that, for example, uses a cellular service to exchange SMS messages or Multimedia Messaging Service (MMS) messages.

In some embodiments, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some embodiments, communication services platform 120 may correspond to an elastic computing resource where the allotted capacity of processing, network, storage, or other computing-related resources may vary over time.

In some embodiments, communication services platform 120 provides one or more API endpoints 166 that can expose services, functionality or content of the communication services platform 120 to one or more of client devices 110 or communication channels 114A-114Z. In some embodiments, an API endpoint 166 can be one end of a communication channel, where the other end can be another system, such as a client device 110Z or communication channel 114Z. In some embodiments, the API endpoint 166 can include or be accessed using a resource locator, such a universal resource locator (URL), of a server or service. The API endpoint 166 can receive requests from other systems, and in some cases, return a response with information responsive to the request. In some embodiments, HTTP or HTTPS methods can be used to communicate to and from API endpoint 166.

In some embodiments, the API endpoint 166 (also referred to as a "request interface" herein) can function as a computer interface through which communication requests, such as message requests, are received and/or created. The communication services platform 120 may include one or more types of API endpoints.

In some embodiments, the API endpoint 166 can include a messaging API and/or voice API whereby external entities or systems can send a communication to create message content and/or request sending of a message and/or request voice services that are provided via voice system 124. The API (e.g., message API and/or voice API) may be used in programmatically creating message content and/or requesting sending of one or more messages. In some embodiments, the API is implemented in connection with a multitenant communication service wherein different accounts (e.g., authenticated entities) can submit independent requests. These requests made through the API can be managed with consideration of other requests made within an account and/or across multiple accounts on the communication service.

In some embodiments, the API of the API endpoint 166 may be used in initiating general messaging or communication requests. For example, a messaging request may indicate one or more destination endpoints (e.g., recipient phone numbers), message content (e.g., text and/or media content), and possibly an origin endpoint (e.g., a phone number to use as the "sending" phone number).

In some embodiments, the API of the API endpoint 166 may be any suitable type of API such as a REST (Representational State Transfer) API, a GraphQL API, a SOAP (Simple Object Access Protocol) API, and/or any suitable type of API. In some embodiments, the communication services platform 120 can expose through the API, a set of API resources which when addressed may be used for requesting different actions, inspecting state or data, and/or otherwise interacting with the communication platform.

In some embodiments, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the API endpoint 166 can include a request instruction module that can be called within an application, script, or other computer instruction execution. For example, a computing platform may support the execution of a set of program instructions where at least one instruction within a script or other application logic is used in specifying a message request and communicating that request.

In some embodiments, the API endpoint 166 can include a console, administrator interface, or other suitable type of user interface. Such a user-facing interface can be a graphical user interface. Such a user interface may additionally work in connection with a programmatic interface In some embodiments, a request, such as a message request, can include a data object characterizing the properties of a message. In some embodiments, the communication services platform 120 is associated with message requests that are programmatically initiated (e.g., an application-to-person (A2P) message). In some embodiments, the message request could be one initiated from an inbound received message.

In some embodiments, a request (e.g., message request and/or voice request) can include one or more of one or more destination endpoints, one or more origin endpoints, and message content. In some embodiments, one or more of these properties may be specified indirectly such as through system or account configuration or messaging conversation identifier. For example, all messages may be automatically assigned an origin endpoint that is associated with an account. In some embodiments, the message content can include any suitable type of media content including, text, audio, image data, video data, multimedia, interactive media, data, and/or any suitable type of message content.

In an illustrative example, used for illustration rather than limitation, communication services platform 120 can include a Software as a Service (SaaS) platform that can at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some embodiments, communication services platform 120, as noted above, can provide communication services that include, but are not limited to, voice services, messaging services (e.g., SMS services or MMS services), email services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, or landline communication network), or a combination thereof, to transfer communication data between parties.

In some embodiments, the conversations system 122 can function to interface with one or more communication network(s) and/or service(s) for communication of a conversation (e.g., a messaging conversation, such as SMS, MMS, and/or chat messaging). In some embodiments, the conversations system 122 can include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The conversations system 122 may additionally or alternatively include an interface to one or more over-the-top (OTT) communication channels which may be offered by a third-party messaging platform (e.g., proprietary social media messaging, messaging applications, etc.).

A route can refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example embodiments, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some embodiments, when the conversations system 122 elects to send a message using a carrier-based channel, the message is communicated to an appropriate carrier connection for routing to the destination endpoint. Carrier-based channels can use SMPP (Short Message Peer-to-Peer protocol) for communicating to an aggregator or another suitable gateway such that the SMS/MMS message is transferred over a carrier network. Once transmitted to the carrier network, the message can be relayed appropriately to arrive at the intended destination. A message in transit may have multiple routing segments that are used in the delivery to an end destination device.

For example, the conversations system 122 can include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) can serve as different route options when the conversations system 122 is determining a channel and/or route to be used for one or more message transmissions.

In some embodiments, SMS Gateways can route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some embodiments, the destination of a message may be used in determining the candidate message routes (and/or channels). For example, a phone number of a destination endpoint or another identifier associated with the intended recipient of the message may be used to identify the destination network of the intended recipient. Each destination network may be assigned a Mobile Country Code (MCC)/Mobile Network Code (MNC) pair that identifies the specific destination network In some embodiments, communication services platform 120 includes a conversations system 122 that can use the phone number associated with the intended recipient of the message to lookup the MCC/MCN pair identifying the destination network. For example, the conversations system 122 can determine the MCC/MNC pair using an MCC/MNC directory that lists the MCC/MNC pair corresponding to each phone number. In some embodiments, the MCC/MNC directory may be stored in a routing provider storage. Alternatively, the MCC/MNC directory may be stored at some other network accessible location. In either case, the conversations system 122 can use the phone number associated with the intended recipient of the message to query the MCC/MNC directory and identify the MCC/MNC pair that identify the corresponding destination network.

In some embodiments, the conversations system 122 can use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the conversations system 122 and the corresponding routing providers and routes available for use with each MCC/MNC pair. That is, the routing provider directory can list the routing providers and routes that are available to the conversations system 122 to deliver messages to the destination network identified by each MCC/MNC pair listed in the routing provider directory.

In some embodiments, voice system 124 of communication services platform 120 can enable the placement of an outbound voice call and/or routing of an inbound voice call. A voice call (also referred to as a "call" herein) can refer to a telephone call between at least two user devices to communicate two-way voice data (e.g., voice sound) in real-time. An outbound voice call can refer to a voice call from a client device 110 associated with an account (e.g., one or more of an organization's account or user account) of the communication services platform 120, and to another device that may not be associated with an account. An inbound voice call can refer to a voice call from a device that may not be associated with an account, and to a client device 110 associated with an account. It can be appreciated that a voice call between two client devices 110 that are associated with an account can be performed using communication services platform 120. Such voice calls can be considered inbound or outbound voice calls relative to the particular client device 110.

In some embodiments, voice system 124 can include one or more voice services used in conjunction with a voice call. In some embodiments, the one or more voice services can include a transcription service that transcribes speech to text. In some embodiments, the one or more voice services can include a recording services that can record the audio data of the voice call. In some embodiments, the one or more voice services can include a voice call queue service that can queue inbound voice calls and release the queued voice call pursuant to user-defined logic. In some embodiment, the one or more voice services can include voice mailbox services that store voice messages of at least inbound calls. In some embodiments, the one or more voice services can include an interactive voice response (IVR) service that interacts with callers and gathers information for them by giving the callers choices via a menu, and then performs the actions based on the answers of the caller through the telephone keypad or through voice response. For example, the IVR service can allow a caller to interact with the back-end telephony system, such as voice system 124, by pressing keys that emit dual-tone multi-frequency (DTMF) signals or saying words that are processed by a speech recognition system. In some embodiments, the one or more voice services can include conference call service that can connect three or more devices in a single call.

In some embodiments, communication services platform 120 can include a multitenant system. Multitenancy can refer to a mode of operation of software applications where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multi-tenant system. The tenants may also be multiple applications competing for shared underlying resources. Multiple organizations can access the resources of communication services platform 120 without any indication that the resources are shared between the multiple organizations. The data of each of the organizations can be logically isolated from one another such that each organization has access to their own data but not the data of other organizations in the multitenant system. In some embodiments, communication services platform 120 can include a single tenant system.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In some embodiments, a "user" may be represented as a single individual. However, other embodiments of the disclosure encompass a "user" being an entity controlled by a set of users and/or an automated source. For example, a set of individual users federated as one or more departments in an organization may be considered a "user." In general, functions described in one embodiment as being performed by the communication services platform 120 can also be performed on the client devices 110A through 110Z in other embodiments (and vice versa), if appropriate. In addition, the functionality attributed to a particular component can be performed by different or multiple components operating together. The communication services platform 120 can also be accessed as a service provided to other systems or devices through appropriate APIs.

As noted above and in some embodiments, a communication channel can refer to an entity, such as a third-party entity (e.g., organizations different from communication services platform 120), that offers services, software or hardware (or a combination thereof) through which messages can be sent to recipient devices. (e.g., organizations different from communication services platform 120). A third party can refer to an entity, such as organization or business (e.g., a different legal entity than communication services platform 120) that is distinct from another entity, such as the entity controlling or owning the communication services platform 120. In some embodiments, the communication services offered by communication channels 114A-114Z can be integrated into communication services platform 120. In some embodiments, the communication services offered by communication channels 114A-114Z can include messaging services. In some embodiments, messaging services can include one or more of a short messaging service (SMS) offered by an SMS channel, a multimedia messaging service (MMS) offered by an MMS channel, or an instant messaging service (e.g., chat messaging) offered by an instant messaging service channel. In some embodiments, communication channels 114A-114Z can also include a voice channel. For example, the voice channel may implement an application to send or receive calls. In another example, the voice channel may include a telecommunication service provider and/or PSTN voice services.

In some embodiments, an instant messaging service is different from an electronic mail (email) service. In some embodiments, the communication channels 114A-114Z can include an email channel. In some embodiments, the communication channels 114A-114Z exclude an email channel. In some embodiments, email messages can use a standard protocol for sending and receiving email messages. The standard protocol can be used across different platforms. In some embodiments, instant messages can use protocols specific to a platform that may or may not be compatible with other platforms. In some embodiments, instant messaging can differ from email in that conversations over instant messaging can happen in real-time, while conversations over email are not in real-time.

In another illustrative example, client device 110Z may want to send an SMS message. In some embodiments, communication services platform 120 and/or client devices 110 include an instance of messaging conversation and voice integration module 151. In some embodiments, messaging conversation and voice integration module 151 of client device 110Z, of communication services platform 120, or a combination thereof can perform one or more aspects of the disclosure.

In some embodiments, an entity (e.g., organization) can be associated with an account of communication services platform 120. Within the particular account of the organization, one or more user accounts of the communication services platform 120 may be associated with different users of the organization.

In some embodiments, communication services platform 120 can provision telephone numbers (e.g., 10-digit long code or short code) to an organization's account and assign the telephone numbers to various user accounts associated with the organization. The assignment of telephone numbers can be flexible such that the assignment of a telephone number can be one to one (e.g., one telephone number to one user account) or one to many (e.g., one telephone number to many user accounts).

In some embodiments, communication services platform 120 can dynamically assign or transfer the telephone numbers. For example, user account A may be assigned telephone number A. Telephone number A can be transferred and assigned to another user account Z and unassigned from user account A, or can be assigned to user account Z and user account A, for instance.

In some embodiments, voice calls and messages can be dynamically routed or sent to and from different telephone numbers. For instance, a user account A may be assigned telephone number A. Telephone number A may have an area code corresponding to Texas. User account A, via application 154 of client device 110A, sends, via communication services platform 120, a message A to an end user device. The end user device can be associated with a telephone number with an area code associated with the state of California. Communication services platform 120 can associate a telephone number with a California area code to the message conversation and send message A to end user device from the associated telephone number with a California area code. From the perspective of the end user device, the message A can appear to be sent from the telephone number with a California area code, rather than from the telephone number A with a Texas area code.

In some embodiments, the telephone number of the client device 110 (e.g., telephone number assigned to the client device 110 by the telecommunications carrier) can be different than the telephone number that is assigned to the user account associated with the client device 110. In some embodiments, the client device 110 may not have a telephone number assigned by a telecommunications carrier. For instance, the client device 110A may be a desktop computer. In some embodiments, the client device 110A can be identified by an internet protocol (IP) address and can send messages of the message conversation using a protocol such as HTTP over TCP/IP (transmission control protocol) or can place a voice call using a Voice over IP (VoIP) protocol (e.g. SIP) via application 154, for example.

Although embodiments of the disclosure are discussed in terms of communication service platforms, embodiments may also be generally applied to any type of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Figure 2:
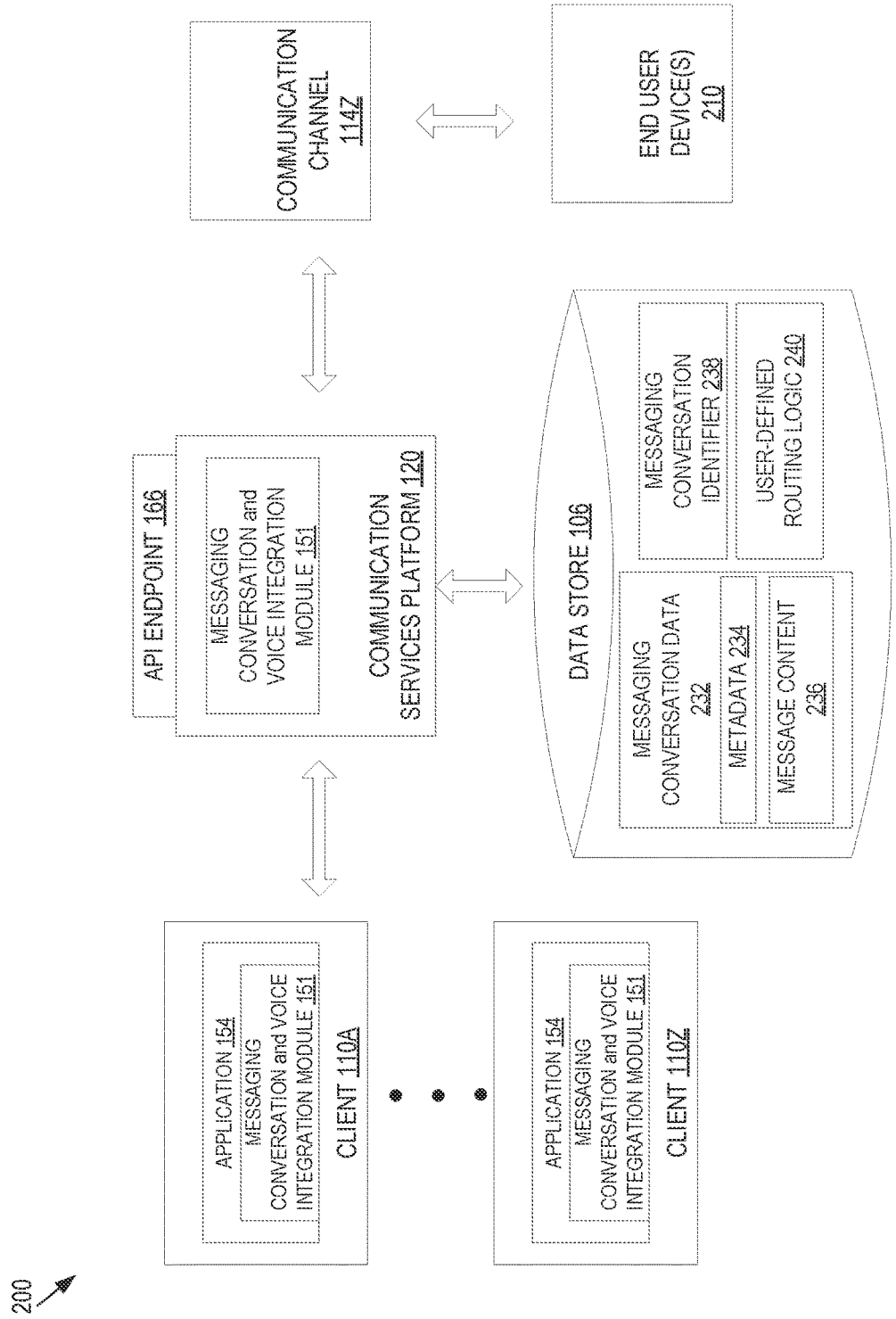
FIG. 2 illustrates an example system architecture 200 used for message conversations and inbound and outbound voice calls, in accordance with some embodiments of the disclosure.

FIG. 2 illustrates an example system architecture 200 used for message conversations and inbound and outbound voice calls, in accordance with some embodiments of the disclosure. Components of FIG. 1 are used to help describe aspects of FIG. 2. The system architecture 200 (also referred to as "system" herein) includes a communication services platform 120, a data store 106, one or more client devices 110A through 110Z, one or more communication channels 114Z and one or more end user devices 210. End user devices 210 can be similar to client devices 110A-110Z or client devices 112A-112Z, as described with respect to FIG. 1.

As illustrated, client devices 110 can communicate with communication services platform 120 using application 154. In some embodiments, instances of application 154 are provided by communication services platform 120 to client device 110A through 110Z to facilitate messaging conversations and/or voice calls between one or more of client device 110 and end user devices 210.

In an illustrative example, users of client devices 110 can be part of an organization that uses one or more communication services provided by communication services platform 120. The users of the client devices 110 can each be assigned a user account (e.g., unique user account) that is associated with the organization and that allows access the communication services provided by communication services platform 120. The organization may use the communication services platform 120 to facilitate messaging conversations and/or voice calls with end users (e.g., customers represented by end user device 210). For instance, client device 110A, via application 154, can conduct a text messaging conversation and/or a voice call with a customer (e.g., end user device 210).

As described above, a user of client device 110A (associated with user account A) using application 154 may be participating in a messaging conversation (e.g., exchanging text messages) with an end user associated with end user device 210. The user of client device 110A may want to initiate an outbound voice call via the application 154 to the end user of the messaging conversation. To such end, the user of client device 110A may initiate an outbound voice call via application 154. Outbound voice calls are further described with respect to FIG. 3A. In some embodiments, an end user device 210 may place an inbound call to a telephone number that is associated with an organization consuming communication services offered by communication services platform 120. Inbound voice calls are further described with respect to FIGS. 3B and 3C.

In some embodiments, data store 106 can include messaging conversation data 232 (also referred to as "conversation data" herein). Messaging conversation data 232 can include message content 236 of one or more messaging conversations (e.g., the message content of the individual messages of a message conversation). For example, the message content 236 can include a series of text message exchanges between participants of the message conversation (e.g., the text content that is displayed at one or more of the sender's device or recipient's device (e.g., "Hello, friend!")).

In some embodiments, the messaging conversation data 232 can include metadata 234 associated with the one or more messaging conversations. Metadata 234 associated with a messaging conversation can include metadata associated with the messaging conversation generally and/or metadata associated with individual messages of a messaging conversation. For example, the metadata 234 can include the names of the participants of the conversation, the telephone numbers of the devices used in the messaging conversation, time and date indicating when each individual message of the message conversation was sent and/or received, and so forth. In some embodiments, the metadata 234 can include an identifier of a destination endpoint of a message (e.g., a recipient's telephone number or IP address, etc.). In some embodiments, the metadata 234 can include an identifier of an origin start point (also referred to "start point identifier" herein) of a message or voice call (e.g. a sender's carrier telephone number or IP address). In some embodiments, the metadata 234 can include an identifier of the communication services platform 120, such as a URL that identifies the communication services platform 120 or a service thereof.

In some embodiments, the metadata 234 can include one or more user account identifiers identifying user accounts that participated or are participating in the messaging conversation. In some embodiments, the metadata 234 can include the user names of the participants of the messaging conversation. In some embodiments, the metadata 234 can include the time and date the messaging conversation was created. In some embodiments, the metadata 234 can include an identifier of the user (e.g. user account) that created the messaging conversation. In some embodiments, the metadata 234 can include the time and date each message of a messaging conversation was sent.

In some embodiments, each message conversation and/or the associated metadata can be associated with a messaging conversation identifier 238. In some embodiments, the messaging conversation identifier 238 can include a unique identifier that is specific to the particular messaging conversation and the associated metadata. In some embodiments, the messaging conversation identifier 238 can be used an entry of a record, such as a look up table, such that the messaging conversation identifier 238 can be used to identify the corresponding messaging conversation and/or associated metadata.

In some embodiments, data store 106 can include user-defined routing logic 240. User-defined routing logic 240 can be configurable by a user and can include instructions or rules indicating the particular communication services (e.g., voice call services and/or message conversation services) to invoke before, during or after a voice call or message conversation. For example, the user-defined routing logic 240 can include instructions to transcribe a call, to implement IVR during a particular part of the call, or invoke a voice message during another part of the call (e.g., "Welcome").

In some embodiments, user-defined routing logic 240 can include instructions indicating how a voice call is to be routed. For example, the user-defined routing logic 240 can instruct communication services platform 120 to use a local telephone number when placing an outbound call so that the area code of the caller telephone number is the same area code as the recipient telephone number. In another example, the user-defined routing logic 240 can include instructions as to which user account an inbound call is to be routed.

In some embodiments, user-defined routing logic 240 is configurable by users via APIs made available by communication services platform 120. In some embodiments, the user-defined routing logic 240 can be retrieved from a server (e.g., third-party client server) and stored at communication services platform 120.

In some embodiments, message conversations and voice calls between a client device 110 and end user device 210 are conducted via communication services platform 120. For example, the client device 110Z can be a mobile phone that has a telephone number assigned by the carrier (e.g., carrier telephone number Z). Additionally, the user account associated with client device 110Z may be assigned a telephone number provisioned by communication services platform 120 (e.g., provisioned telephone number Z). Client device 110Z (e.g., user account Z) can send a message of the messaging conversation, via communication services platform 120 to the end user device 210 using the HTTP over TCP/IP. The message can addressed to the communication services platform 120 using a communication services platform identifier, such as a URL. The communication services platform 120 can determine the destination endpoint (e.g., telephone number B of the end user device 210) based on the messaging conversation identifier. For instance, using the messaging conversation identifier, communication services platform 120 identify from a record (e.g., lookup table) corresponding metadata that includes the telephone number of the end user device 210. Communication services platform 120 can identify the user-defined routing logic associated with the user account Z to determine from which provisioned telephone number the message is to be sent. Communication services platform 120 can send the message to the telephone number of the end user device 210 and from the provisioned telephone number identified using the user-defined routing logic, which may or may not be the telephone number Z assigned to client device 110Z.

In another example, the client device 110Z can receive a message of a messaging conversation from end user device 210. The message can be received by communication services platform 120. Communication services platform 120 can use the provided telephone number to identify the destination endpoint identifier (also referred to "endpoint identifier" herein). For instance, the endpoint identifier can include one or more of the user account associated with the messaging conversation or the identifier of the client device 110Z associated with the user account (e.g., carrier telephone number of the client device 110Z, telephone number assigned to client device 110Z by communication services platform 120, or IP address associated with the client device 110Z). The communication services platform 120 can use a record, such as a lookup table that associates the provided telephone number with the endpoint identifier. Communication services platform 120 can send the message to client device 110Z using the endpoint identifier (e.g., carrier telephone number of client device 110Z or IP address). As noted above, the carrier telephone number of the client device 110Z may be different from the telephone number assigned to the user account by the communication services platform 120, in some embodiments.

Figure 3A:
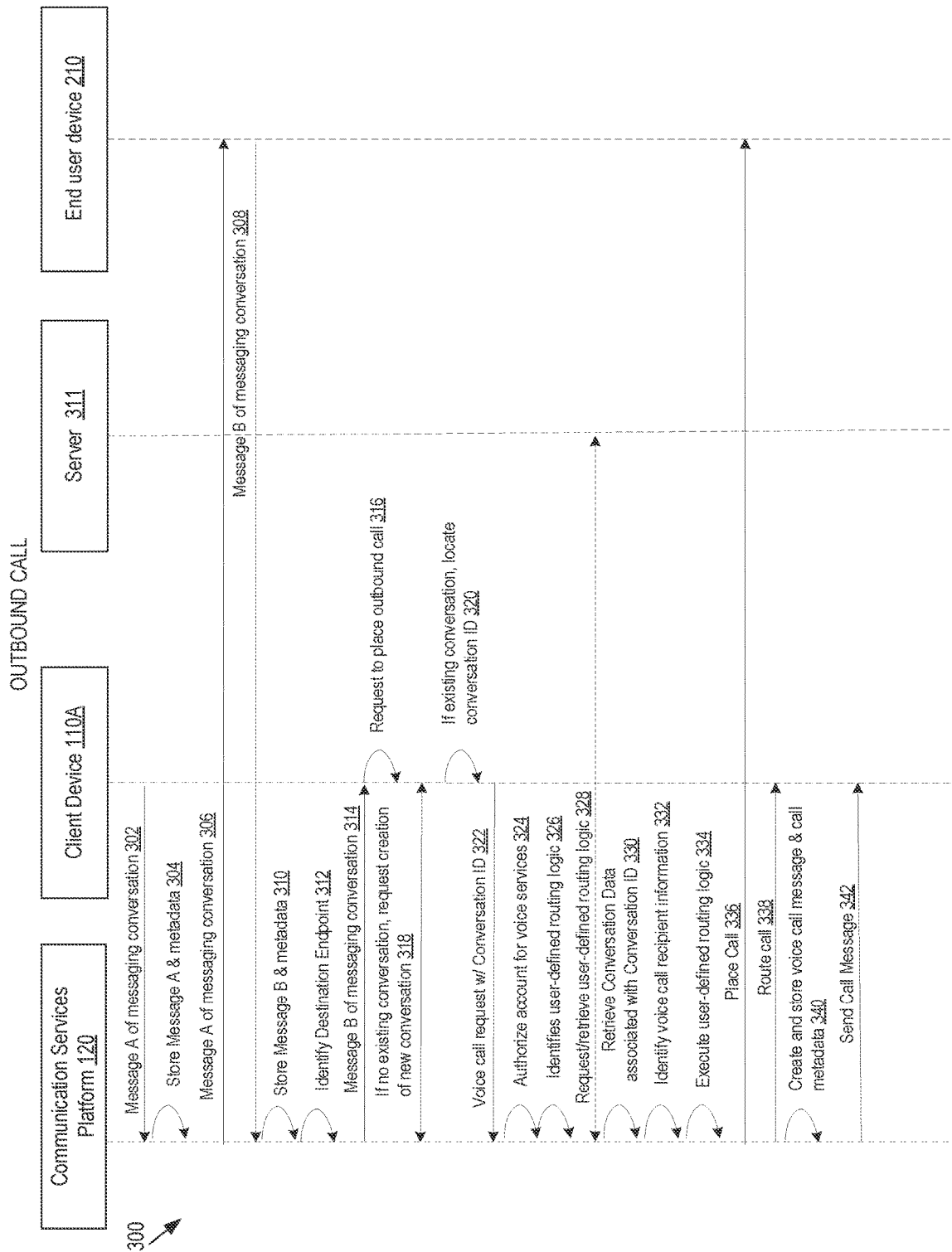
FIG. 3A illustrates a sequence diagram of communications between components of a system used for messaging conversations and outbound voice calls, in accordance with embodiments of the disclosure.
Figure 3B:
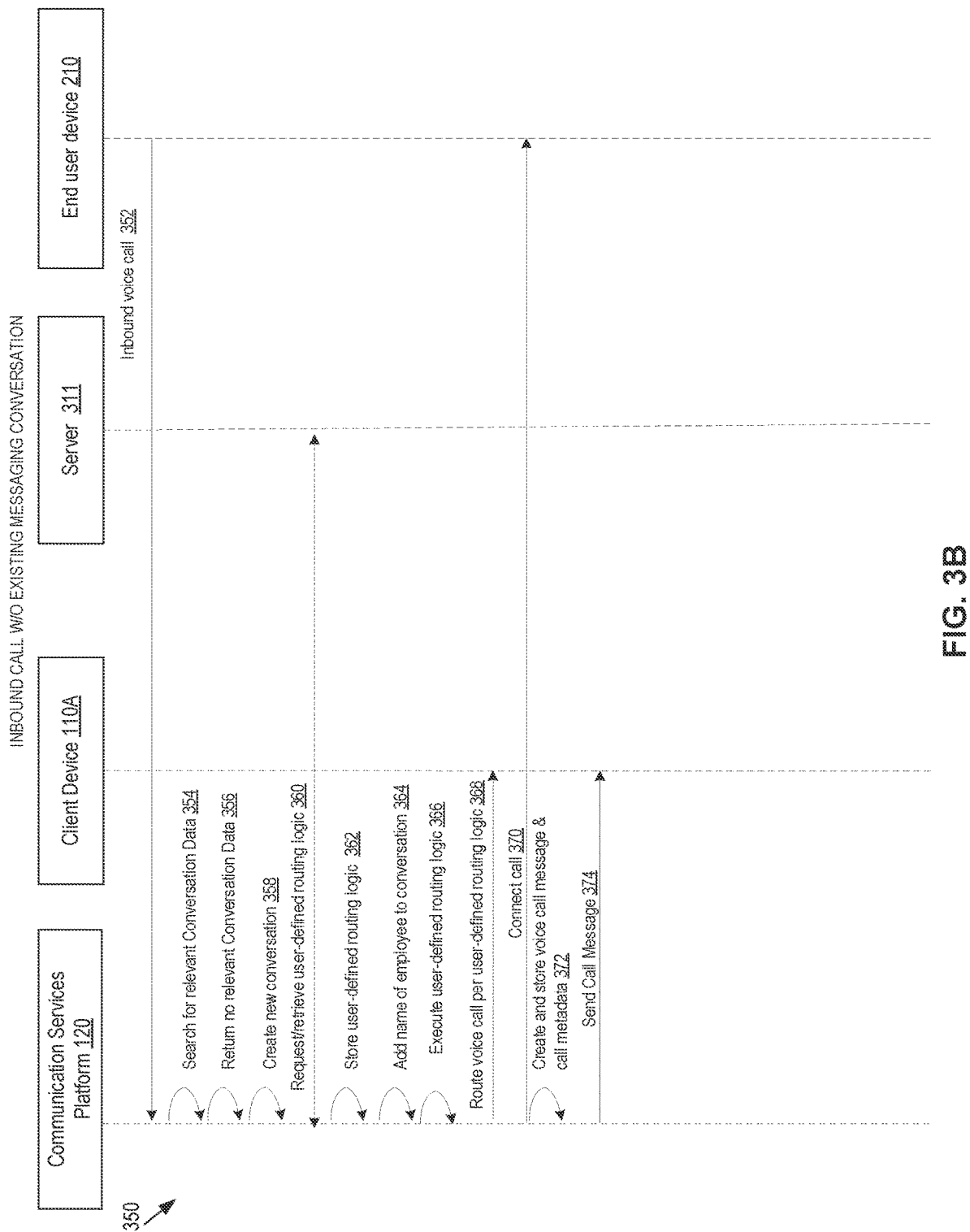
FIG. 3B illustrates a sequence diagram of communications between components of a system used for messaging conversations and inbound voice calls for new messaging conversations, in accordance with embodiments of the disclosure.
Figure 3C:
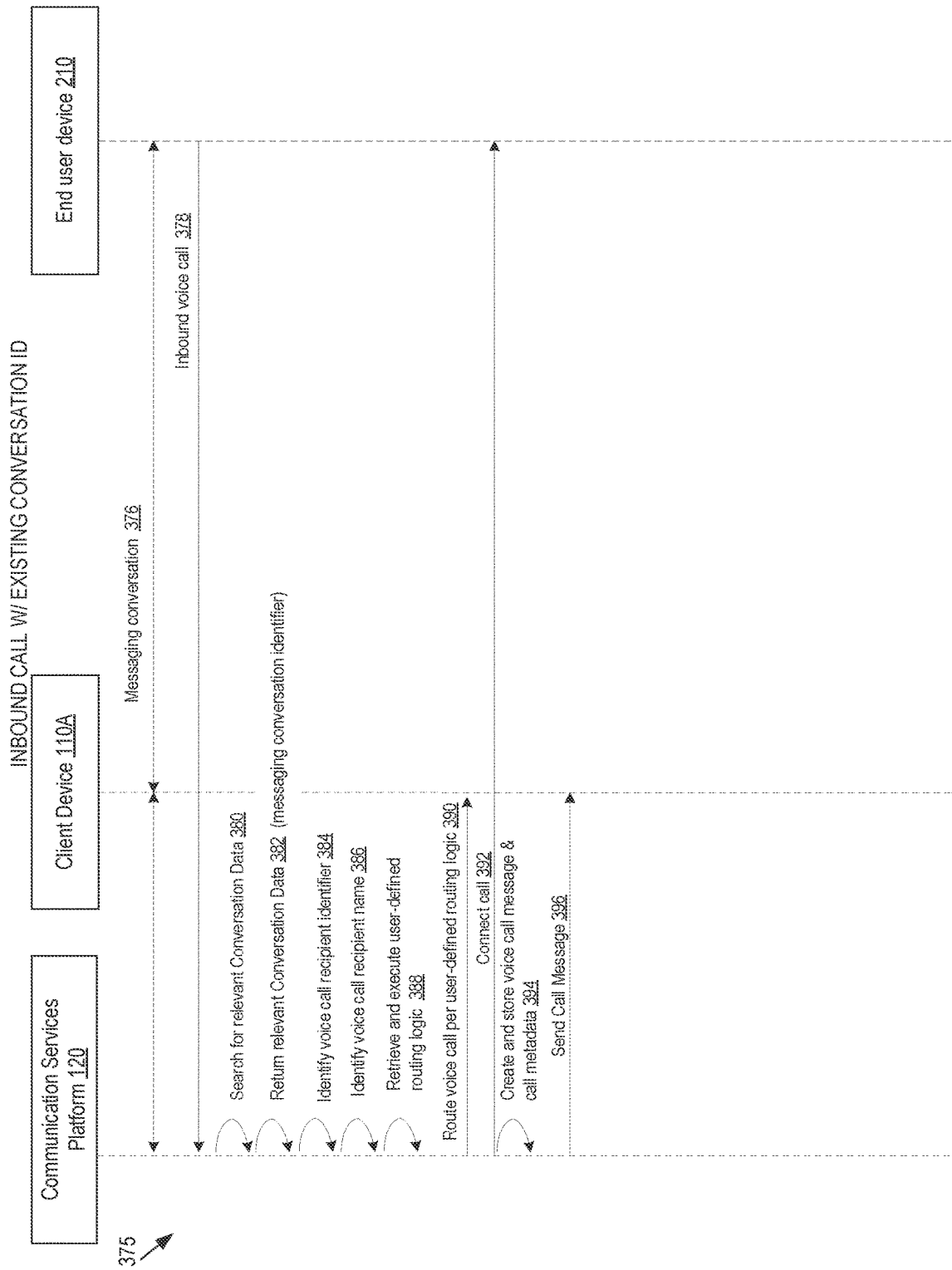
FIG. 3C illustrates a sequence diagram of communications between components of a system used for messaging conversations and inbound voice calls associated with existing messaging conversations, in accordance with embodiments of the disclosure.

Elements of FIG. 1 and FIG. 2 are used with respect to FIG. 3A, FIG. 3B, and FIG. 3C to help describe features of diagrams 300, 350, and 375. The operations described with respect to FIG. 3A, FIG. 3B and FIG. 3C are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. In some embodiments, operations shown in one or more of a particular diagram 300, 350, and 375 can be combined with operations of another one of diagram 300, 350 and 375.

Referring to FIGS. 3A, 3B, and 3C, the respective diagrams 300, 350 and 375 illustrate communication services platform 120, client device 110A, server 311, and end user device 210. The server 311 can include a server machine or any other type of client device as described above with respect to client device 110. In some embodiments, one or more of communication services platform 120, client device 110A using application 154, and in particular messaging conversation and voice integration module 151 can implement the operations depicted in diagrams 300, 350 and 375. In some embodiments, client device 110A using client account A conducts a messaging conversation and/or voice call with end user device 210.

FIG. 3A illustrates a sequence diagram of communications between components of a system used for messaging conversations and outbound voice calls, in accordance with embodiments of the disclosure.

In some embodiments, the messaging conversation can include messages using one of a short messaging service (SMS) channel, a multimedia messaging service (MMS) channel, or an instant messaging service channel. In some embodiments, the messaging conversation excludes communication using an electronic mail (e-mail) channel.

In some embodiments, at operation 302 client device 110A (e.g., client account A) sends a message A, such as an SMS message, of a messaging conversation to end user device 210 via communication services platform 120. In some embodiments, the message is sent by client device 110A using an API call directed to a URL associated with the communication services platform 120. In some embodiments, to send message A via communication services platform 120, client device 110A can send message information that includes one or more of the messaging conversation identifier, the message A (e.g., message content) and metadata.

For example, the client device 110A can send the message content, a messaging conversation identifier, and some metadata to the communication services platform 120. For instance, the metadata can include the account identifier of the user account associated with the client device 110A.

In some embodiments, client device 110A can display a GUI, via application 154, having a messaging element GUI that allows a user of client device 110A to send and receive messages on behalf of the corresponding user account (e.g., user account A). The user can enter message content into the messaging element GUI and send the message content to a designated recipient.

At operation 304, communication services platform 120 can store the message A (e.g., message content) and the metadata at data store 106, for example. The message A and the metadata can be associated with the corresponding messaging conversation identifier using a record, such as a look up table.

At operation 306, communication services platform 120 can send message A to end user device 210. In some embodiments, communication services platform 120 can use the messaging conversation identifier to identify a corresponding endpoint identifier, such as the telephone number of end user device 210. It can be noted that in some embodiments, a destination endpoint, such as a telephone number of end user device 210 is not stored or otherwise available at the client device 110A. By not making the telephone number of the end user device 210 available to the client device 110A, greater security of the telephone numbers of end users can be implemented, in accordance with some embodiments. In other embodiments, the destination endpoint, such as the telephone number of the end user device 210 can be stored at the client device 110A and the metadata provided by the client device 110A to the communication services platform 120 can include the destination endpoint.

For example, the communication services platform 120 can use the messaging conversation identifier to identify the destination endpoint (e.g., telephone number of end user device 210) from the metadata associated with the messaging conversation and stored at data store 106.

At operation 308, end user device 210 sends a message (e.g., message B) to client device 110A, via communication services platform 120. End user device 210 sends the message to the telephone number identified in the received message A. As described herein, the telephone number identified in the received message A can be a telephone number that is provisioned by communication services platform 120.

At operation 310, communication services platform 120 can store the message (e.g., message B) and the metadata at data store 106, for example. For example, the message (e.g., message content) and metadata can be stored and associated with the messaging conversation identifier.

At operation 312, communication services platform 120 can identify a destination endpoint for message B. In some embodiments, communication services platform 120 can use the telephone number associated with message B to identify the user account and/or the endpoint identifier (e.g., carrier telephone number, assigned telephone number, or IP address of client device 110A, etc.) associated with the user account. In some embodiments, the destination telephone number associated with message B can be the same number that is assigned to client device 110A or different than the number assigned to client device 110A by communication services platform 120. Additional details regarding identifying a destination endpoint associated with a message is further described above with respect FIG. 2.

At operation 314, communication services platform 120 sends the message (e.g., message B) to client device 110A using the endpoint identifier. Communication services platform 120 can also send metadata with the message, such as the name of the end user for display at the client device 110A and/or the messaging conversation identifier.

At operation 316, the client device 110A receives a request to place an outbound call. For example, the user of client device 110A may use the GUI of application 154 to place a voice call. In an example, a user of client device 110A may be participating in a messaging conversation with the user of end user device 210 and may desire to place a call. The user of client device 110A may select a GUI element of the GUI of the application 154 to request a call associated with the message conversation is to be placed. In another example, a message conversation that includes the recipient of the voice call as a participant may not exist. The user of client device 110A may retrieve a contact (e.g., name) from the contact list of application 154 and select a GUI element of the GUI of the application 154 to place a call to the contact.

At operation 318, if no messaging conversations that have the recipient of the voice call as a participant are identified, end user device 210 requests the creation of a new message conversation. In some embodiments, end user device 210 can send a request to the communication services platform 120 to create a new message conversation. In response to the request, communication services platform 120 can generate a new messaging conversation identifier and return the messaging conversation identifier to the client device 110A.

At operation 320, if a message conversation that has the recipient of the voice call as a participant is identified, end user device 210 can identify the messaging conversation identifier that is associated with the identified message conversation.

At operation 322, responsive to the request to place an outbound voice call (operation 316), client device 110A can send a request, such as an API request, to communication services platform 120 to place an outbound voice call. The request to place the outbound call can be responsive to the initial request as describe with respect to operation 316. In some embodiments, the request identifies or includes the messaging conversation identifier. In some embodiments, the request can include a command (e.g., API command) indicating that a voice call is to be placed to a participant (e.g., unidentified participant) of the message conversation. In some embodiments, the telephone number of the end user device 210 is absent (e.g., not identified or included) in the request to place the voice call. In some embodiments, the user name of the recipient of the voice call is absent from the request to place the voice call.

At operation 324, communication services platform 120 determines whether the user account associated with the voice call request is authorized to place a voice call via communication services platform 120. For example, an organization may subscribe to voice services. The voice services, provided by communication services platform 120, may be accessible to one or more user accounts of the organization. Communication services platform 120 can identify the user account information from the metadata associated with the messaging conversation identifier and determine whether the particular user account is authorized to place a voice call. If the user account is authorized to place a voice call, communication services platform 120 can proceed to operation 326. If the user account is not authorized to place a voice call, communication services platform 120 can send a notification back to client device 110A indicating that the requested voice services are not authorized for the particular account, for example.

At operation 326, communication services platform 120 identifies user-defined routing logic 240 associated with the user account and or account of the corresponding organization. In some embodiments, the user-defined routing logic 240 may be stored at communication services platform 120. In some embodiments, the user-defined routing logic 240 may be stored at a third-party server, such as server 311.

At operation 328, in instances that the user-defined routing logic 240 is stored at a third-party server, such as server 311, communication services platform 120 can request the server 311 for the user-defined routing logic 240. In some embodiments, communication services platform 120 may not locally store the user-defined routing logic 240 and may request the user-defined routing logic 240 from server 311 for every voice call instance. In some embodiments, communication services platform 120 can obtain the user-defined routing logic 240 from the server 311 and store the user-defined routing logic 240 at communication services platform 120 for future use.

At operation 330, communication services platform 120 can retrieve the messaging conversation data using the messaging conversation identifier. As described above with at least respect to FIG. 2, communication services platform 120 can associated or index the messaging conversation data of a messaging conversation with the messaging conversation identifier. In some embodiments, the messaging conversation data can identify the participants of the messaging conversation. In some embodiments, the messaging conversation data can include the information corresponding to the recipient identifiers and sender identifiers associated with the particular messaging conversation. For example, the information can include the telephone numbers of the recipient devices and/or sender devices. The information can include the names (e.g., friendly name, such as "John") of the recipients and senders of the messages of the messaging conversation. In another example, the information can include the user account identifier(s) of the user accounts participating in the messaging conversation.

At operation 332, communication services platform 120 identifies the voice call recipient information (e.g. voice call recipient identifier) from the messaging conversation data. In some embodiments, the voice call recipient information can include the telephone number of the end user device 210. In some embodiments, the voice call recipient information can include the name of the user of the end user device 210. It can be noted, and as described above, that in some embodiments the telephone number of the end user device 210 is not made available to the client device 110A. In some embodiments, the recipient telephone number can be secured at the communication services platform 120 and not provided to client device 110A.

It can also be noted that in some embodiments two or more participants can participate in a messaging conversation. For example, an end user, one or more employees of the organization (e.g., associated with different user accounts and/or client devices), and/or one or more bots (e.g., chat bots, such as a program that can interact, often autonomously, with end users) can be participants in a messaging conversation. In some embodiments, communication services platform 120 performs a filtering operation that implements filtering criteria to identify the recipient of the voice call and/or the corresponding recipient telephone number. In some embodiments, communication services platform 120 filters, among the participants of the messaging conversation, any participants that are registered at the communication services platform 120 (e.g., have user accounts and/or in the case of the bots have associated unique identifiers). The participants that are registered with the communication services platform 120 can be filtered from the participants of the messaging conversation, which can leave the remaining participant as the recipient of the voice call. In some embodiments, one or more of the recipient telephone number or the recipient name (e.g., "Daniel") can be identified from the messaging conversation data. In other embodiments, other filtering techniques can be implemented to determine the recipient of the voice call.

At operation 334, communication services platform 120 executes user-defined routing logic identified at operation 326 or operation 328. For example, communication services platform 120 can determine the provisioned telephone number that is to be used as the caller telephone number, which may or may not be different than the telephone number provisioned to client device 110A. It can be noted that in some embodiments the user-defined routing logic includes instructions as to which voice services are to be executed before, during or after the call.

At operation 336, communication services platform 120 can place the voice call to the recipient telephone number. For example, the voice call can be place over PSTN. In some embodiments, additional metadata can be included with the voice call including the caller's telephone number and/or caller's name. The caller's telephone number can be determined from the user-defined routing logic, as described above.

At operation 338, communication services platform 120 can route the voice call to client device 110A. In some embodiments, the voice call is routed pursuant to user-defined routing logic. For example, the voice call can be routed in response to the recipient (e.g., user of end user device 210) answering the voice call or in response to the voice call going to a voice mailbox. In another example, the voice call can be routed immediately following placement of the voice call to the end user device 210 so that the ring tones, if any, can be transmitted to the client device 110A.

At operation 340, communication services platform 120 can create and store a voice call message and voice call metadata. In some embodiments, the voice call metadata can include one or more of the time of the voice call, the duration of the voice call, the participants of the voice call, the telephone number of the recipient of the voice call, the telephone number assigned to the client device 110A (or the corresponding user account), and/or status identifiers of the voice call. The status identifiers of the voice call can indicate the status of the voice call attempt. For example, a completed identifier can indicate that the called recipient answered the call and was connected to the caller (e.g., user of client device 110A). A busy identifier can indicate that a busy signal was received when trying to connect to the called recipient. A no-answer identifier can indicate that the called recipient did not pick up before the timeout period (e.g., specified in user-defined routing logic) passed. A failed identifier can indicating that communication services platform was not able to place the voice call to the end user device 210 or route the call to the client device 110A.

In some embodiments, a message (e.g., voice call message) can be created as further described below with respect to operation 342. In some embodiments, the voice call message can be a message that is part of the message conversation. In some embodiments, the voice call message can be associated with the messaging conversation identifier and stored at data store 106 of communication services platform 120. For example, the message can be a text message that includes information corresponding to the voice call. For instance, a text message (e.g., voice call message) can include the called recipient's name and the time and/or duration of the voice call and/or an indication that a voice call was placed.

At operation 342, a message (e.g., voice call message) can be sent to client device 110A. For example, a SMS message can be sent to the client device 110A. The SMS message can include information pertaining to the voice call. In some embodiments, the voice call message can be displayed along with other messages of the message conversation (e.g., message thread).

FIG. 3B illustrates a sequence diagram of communications between components of a system used for messaging conversations and inbound voice calls for new messaging conversations, in accordance with embodiments of the disclosure.

At operation 352, communication services platform 120 receives an inbound voice call from end user device 210. In some embodiments, the inbound voice call can include the telephone number of the caller device (e.g., telephone number of end user device 210) and the telephone number of called device. In some embodiments, the telephone number of the called device is a telephone number provisioned by communication services platform 120. As noted herein, the provisioned telephone number may or may not be assigned to client device 110A.

At operation 354, communication services platform 120 searches for relevant messaging conversation data based on the inbound voice call. In some embodiments, communication services platform 120 can use one or more of the telephone number of the caller device and the telephone number of the called device to search the messaging conversation data to identify a messaging conversation having telephone number(s) that correspond to the telephone number of the caller device and/or the telephone number of the called device. For example, communication services platform 120 can determine whether any of the messaging conversations associated with the organization are messaging conversations between the two telephone numbers (e.g., the caller device telephone number and the called device telephone number).

It can be noted that the inbound call from end user device 210 may not include a messaging conversation identifier. In such instances, and in some embodiments, the communication services platform 120 can search the messaging conversation data to find a corresponding messaging conversation without using the messaging conversation identifier.

At operation 356, communication services platform 120 returns no relevant messaging conversation data. In some embodiments, a messaging conversation does not exist for the two telephone numbers associated with the inbound call. In such cases, communication services platform 120 may not identify any relevant messaging conversations (and no relevant messaging conversation identifier) that correspond to the telephone number(s) of the inbound call.

At operation 358, communication services platform 120 creates a new messaging conversation responsive to determining that no messaging conversation exists for the two telephone numbers. In some embodiments, creating a new messaging conversation can include creating a new messaging conversation identifier. In some embodiments, creating a new messaging conversation can also include creating a message with participants. The participants can be identified by the caller device telephone number and the called device telephone number. The two telephone numbers can be associated with the messaging conversation, in some embodiments. In some embodiments, the new messaging conversation can be stored at communication services platform 120 (e.g., at data store 106).

At operation 360, communication services platform 120 can request server 311 for user-defined routing logic and server 311 can return the requested user-defined routing logic. Operation 360 can be similar to operation 328 of FIG. 3A, the features of which can apply here but are not repeated for the sake of brevity. In some embodiments, the communication services platform 120 can request user-defined routing logic instructing communication services platform 120 as to how to handle the inbound call to the particular telephone number.

In some embodiments, the server 311 can identify the name and/or email of the user that associated with the called device telephone number, and send the information to communication services platform 120 responsive to the request. In some embodiments, the server 311 can identify which user account to which the incoming call is to be routed. In some embodiments, the server 311 can identify information related to the caller device telephone number, such as an email address or name, and send the information to communication services platform 120 responsive to the request for user-defined routing logic 240.

At operation 362, communication services platform 120 stores the user-defined routing logic. For example, communication services platform 120 can store the user-defined routing logic at data store 106. In some embodiments, the stored user-defined routing logic can be used for subsequent voice calls, such as inbound voice calls, to the called device telephone number.

At operation 364, communication services platform 120 can add information obtained from the server 311, such as the name of the employee or name of the end user, to the messaging conversation. For example, an email address or friendly name (e.g., "Joyce") of the caller and/or called can be added to the messaging conversation and/or associated message.

At operation 366, communication services platform 120 executes user-defined routing logic. Operation 366 can be similar to operation 334 of FIG. 3A, and implement similar features to operation 334, which are not reproduced here for the sake of brevity. In some embodiments, the one or more voice serves that correspond to or are defined by the user-defined routing logic can be executed before, during, and/or after the voice call.

At operation 368, communication services platform 120 can route the call to the client device 110A pursuant to the user-defined routing logic. For example, the user-defined routing logic can indicate to which user account the inbound call is to be routed. Communication services platform 120 can identify the corresponding provisioned telephone number, which may the same or different than the called device telephone number, and route the inbound voice call to the provisioned telephone number or other address or telephone number.

At operation 370, communication services platform 120 can connect the end user device 210 to the client device 110A.

At operation 372, communication services platform 120 can create and store a message (e.g., voice call message) and voice call metadata. Operation 370 can be similar to operation 340 of FIG. 3A and include similar features, which are not repeated here for the sake of brevity.

At operation 374, communication services platform 120 can send a message that includes information pertaining to the voice call to client device 110A. In some embodiments, the message can be an initial message of the messaging conversation. In some embodiments, the communication services platform 120 can also send a messaging conversation identifier associated with then new messaging conversation. Operation 374 can be similar to operation 342 of FIG. 3A and include similar features, which are not repeated here for the sake of brevity.

FIG. 3C illustrates a sequence diagram of communications between components of a system used for messaging conversations and inbound voice calls associated with existing messaging conversations, in accordance with embodiments of the disclosure.

At operation 376, client device 110A and end user device 210 can conduct a messaging conversation via communication services platform 120. In some embodiments, one or more of operations 302 through 314 of FIG. 3A can be performed at operation 376.

At operation 378, communication services platform 120 receives an inbound voice call from end user device 210. Operation 378 can be similar to operation 352 of FIG. 3B and include similar features, which are not repeated here for the sake of brevity.

At operation 380, communication services platform 120 searches for relevant messaging conversation data based on the inbound voice call. In some embodiments, communication services platform 120 can use one or more of the telephone number of the caller device and the telephone number of the called device to search the messaging conversation data to identify a messaging conversation having telephone number(s) that correspond to the telephone number of the caller device and/or the telephone number of the called device. Operation 380 can be similar to operation 354 of FIG. 3B and include similar features, which are not repeated here for the sake of brevity.

At operation 382, communication services platform 120 returns relevant messaging conversation data. In some embodiments, a messaging conversation does exist for the two telephone numbers associated with the inbound call. In such cases, communication services platform 120 may identify a corresponding messaging conversation (e.g. operation 280) and return the messaging conversation identifier associated with the identified messaging conversation.

At operation 384, communication services platform 120 identifies the voice call recipient identifier from the messaging conversation data. In some embodiments, the voice call recipient identifier can include the telephone number assigned to the client device 110A or another identifier, such as an email or user account identifier of the user of the client device 110A.

In some embodiments, to identify the voice call recipient identifier, the communication services platform 120 can use the messaging conversation identifier to identify all the participants in the messaging conversation. In some embodiments, communication services platform 120 can perform a filtering operation based on one or more filter criteria to identify, among the participants, the recipient of the voice call and/or the corresponding voice call recipient identifier. In some embodiments, communication services platform 120 filters, among the participants of the messaging conversation, any participants that are not registered at the communication services platform 120 (e.g., are not associated with a user account). The participants that are not registered with the communication services platform 120 can be filtered from the participants of the messaging conversation, which can leave the remaining participant as the recipient of the voice call. In some embodiments, if multiple participants remain subsequent to the filtering operation (e.g., several user accounts participating in the messaging conversation), communication services platform 120 can implement additional filtering criteria. For example, the communication services platform 120 can filter out participants by a time criteria such that the participant that last communicated with the end user of end user device 210 can be identified as the recipient of the voice call.

At operation 386, communication services platform 120 can identify the name of the voice call recipient. In some embodiments, to identify the voice call recipient name, communication services platform 120 can identify from the messaging conversation data the name that is associated with identified recipient.

At operation 388, communication services platform 120 retrieves user-defined routing logic 240. Operation 388 can be similar to operation 366 of FIG. 3B and include similar features, which are not repeated here for the sake of brevity.

At operation 390, communication services platform 120 routes the voice call per user-defined routing logic. Operation 390 can be similar to operation 368 of FIG. 3B and include similar features, which are not repeated here for the sake of brevity.

At operation 392, communication services platform 120 connects end user device 210 to the voice call. Operation 392 can be similar to operation 370 of FIG. 3B and include similar features, which are not repeated here for the sake of brevity.

At operation 394, communication services platform 120 creates and stores a message, such as a voice call message, and voice call metadata. Operation 394 can be similar to operation 372 of FIG. 3B and include similar features, which are not repeated here for the sake of brevity.

At operation 396, communication services platform 120 sends the message, such as a voice call message, to client device 110A. In some embodiments, the voice call message can be part of an existing messaging conversation between end user device 210 and client device 110A. Operation 396 can be similar to operation 374 of FIG. 3B and include similar features, which are not repeated here for the sake of brevity.

Figure 4:
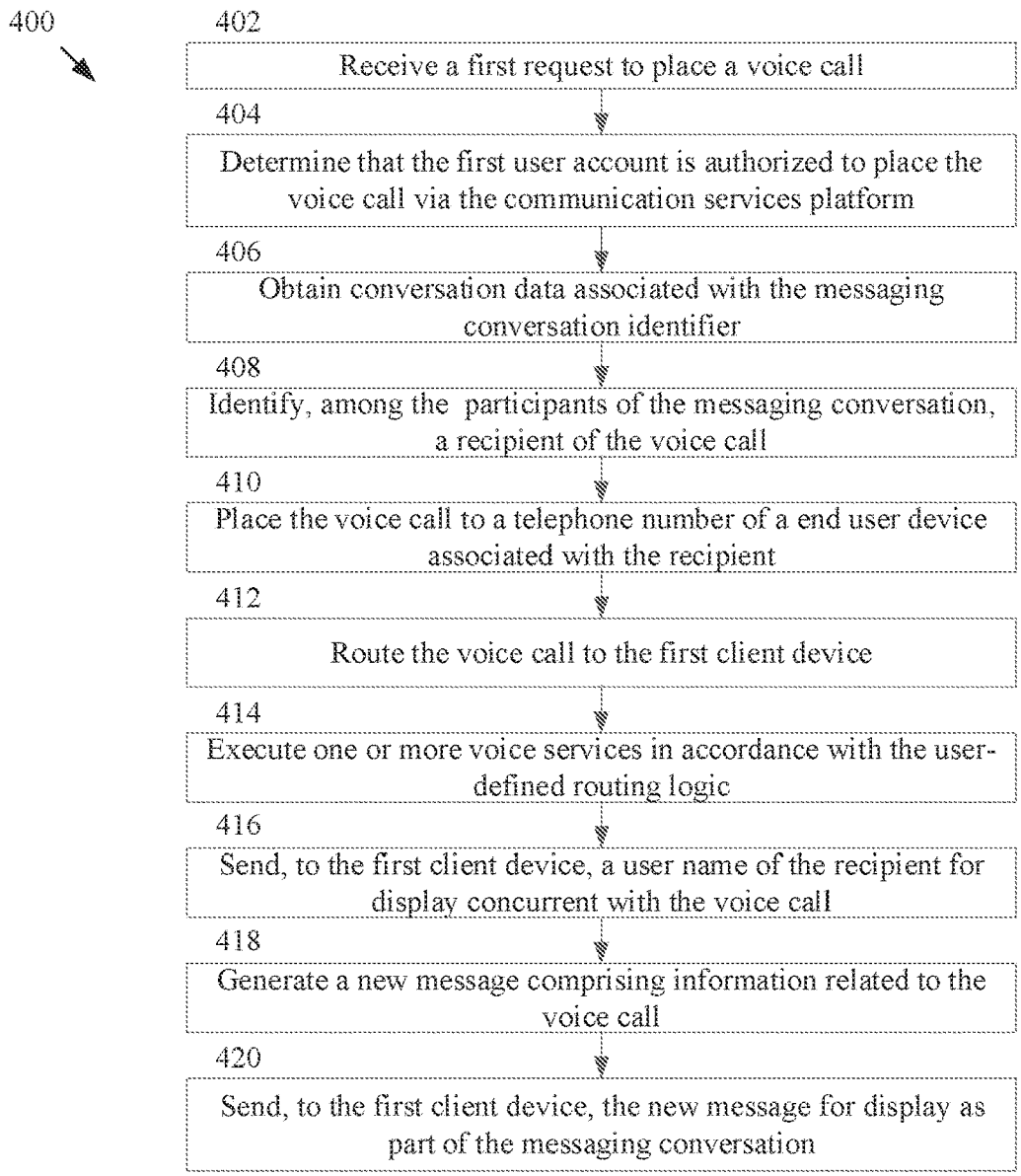
FIG. 4 depicts a flow diagram of an example method for placing an outbound voice call, in accordance with some embodiments of the disclosure.

FIG. 4 illustrates method 400. Method 400 and/or each of the aforementioned method's individual functions, routines, subroutines, or operations can be performed by a processing device, having one or more processing units (CPU) and memory devices communicatively coupled to the CPU(s). In some embodiments, the method 400 can be performed by a single processing thread or alternatively by two or more processing threads, each thread executing one or more individual functions, routines, subroutines, or operations of the method. Method 400 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by messaging conversation and voice integration module 151 described in FIGS. 1 and 2. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-3C may be used herein to help describe FIG. 4.

FIG. 4 depicts a flow diagram of an example method 400 for placing an outbound voice call, in accordance with some embodiments of the disclosure. In some embodiments, method 400 can be performed by communication services platform 120, and in particular messaging conversation and voice integration module 151 of communication services platform 120.

At operation 402, processing logic receives a first request to place a voice call. In some embodiments, processing logic receives, via a first application programming interface (API) call from a first client device associated with a first user account of a communication services platform, a first request to place a voice call. The first request can include a messaging conversation identifier that identifies a messaging conversation. In some embodiments, the messaging conversation includes first messages using one of a short messaging service (SMS) channel, a multimedia messaging service (MMS) channel, or an instant messaging service channel.

At operation 404, processing logic determines that the first user account is authorized to place the voice call via the communication services platform.

At operation 406, processing logic obtains conversation data (also referred to as "messaging conversation data") associated with the messaging conversation identifier. In some embodiments, processing logic obtains conversation data associated with the messaging conversation identifier and stored in a data store, where the conversation data identifies multiple participants of the messaging conversation.

At operation 408, processing logic identifies, among the multiple participants of the messaging conversation, a recipient of the voice call. In some embodiments, processing logic identifies, among the multiple participants of the messaging conversation, a recipient of the voice call from the first client device based on filter criteria. In some embodiments, to identify, among the multiple participants of the messaging conversation, the recipient of the voice call from the first client device based on the filter criteria, processing logic filters, among the multiple participants, any participants that are registered at the communication services platform. In some embodiments, the identified participant (e.g., recipient) can be associated with a telephone number. The identified participant can be used to identify the associated telephone number of the end user device.

At operation 410, processing logic places the voice call to a telephone number of an end user device associated with the recipient. In some embodiments, wherein the voice call placed to the telephone number of the end user device is from a different telephone number than a telephone number assigned to the first user account of the first client device. In some embodiments, the telephone number of the end user device is absent from the first request to place the voice call. In some embodiments, a user name of the recipient is absent from the first request to place the voice call.

At operation 412, processing logic routes the voice call to the first client device. In some embodiments, processing logic routes the voice call to the first client device subsequent to placing the voice call to the telephone number of the end user device. In some embodiments, routing the voice call to the first client device is responsive to an answering of the voice call at the end user device.

At operation 414, processing logic executes one or more voice services in accordance with the user-defined routing logic. In some embodiments, the user-defined routing logic identifies the one or more voice services of the communication services platform to implement for the voice call.

At operation 416, processing logic sends, to the first client device, a user name of the recipient for display concurrent with the voice call.

At operation 418, processing logic generates a new message comprising information related to the voice call.

At operation 420, processing logic sends, to the first client device, the new message for display as part of the messaging conversation.

Figure 5:
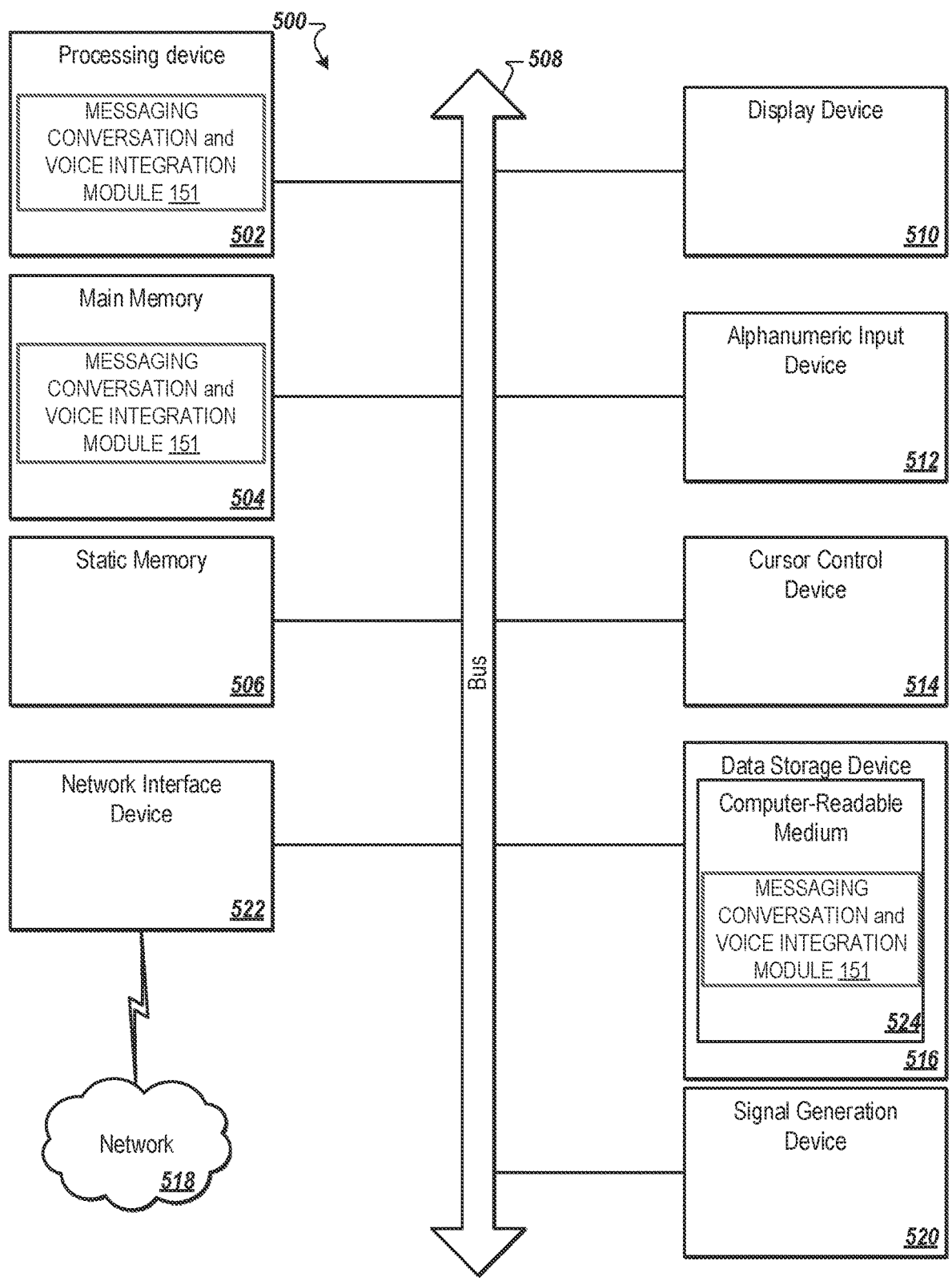
FIG. 5 is a block diagram illustrating an exemplary computer system, in accordance with some embodiments of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed by computer system 500, cause computer system 500 to perform one or more operations of messaging conversation and voice integration module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and messaging conversation and voice integration module 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 of messaging conversation and voice integration module 151 embodying any one or more of the methodologies or functions described herein. The sets of instructions of the system architecture 100 and of messaging conversation and voice integration module 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

The invention claimed is:

1. A method, comprising:
sending, by a software as a service (SaaS) platform and to an end user device, a message of a messaging conversation between the end user device and a first client device associated with a first user account of the SaaS platform, wherein:
the message is associated with a first telephone number provisioned by the SaaS platform,
the messaging conversation is associated with a messaging conversation identifier,
the end user device is associated with a second telephone number, and
the first client device is associated with a third telephone number;
receiving, via a first application programming interface (API) call from the first client device, a first request to place a voice call based on the messaging conversation identifier; and
responsive to receiving the first request, placing the voice call to the second telephone number, wherein the voice call is associated with the first telephone number provisioned by the SaaS platform and that is different than the third telephone number assigned to the first client device.

2. The method of claim 1, wherein the third telephone number assigned to the first client device is assigned by a carrier service.

3. The method of claim 1, further comprising:
identifying, among a plurality of participants of the messaging conversation, a recipient of the voice call from the first client device based on filter criteria.

4. The method of claim 3, wherein identifying, among the plurality of participants of the messaging conversation, the recipient of the voice call from the first client device based on the filter criteria, comprises:
filtering, among the plurality of participants, any participants that are registered at the SaaS platform.

5. The method of claim 1, further comprising:
determining that the first user account is authorized to place the voice call via the SaaS platform.

6. The method of claim 1, further comprising:
subsequent to placing the voice call to the second telephone number of the end user device, routing the voice call to the first client device.

7. The method of claim 6, wherein routing the voice call to the first client device is responsive to an answering of the voice call at the end user device.

8. The method of claim 1, further comprising:
executing one or more voice services in accordance with user-defined routing logic identifying the one or more voice services of the SaaS platform to implement for the voice call.

9. The method of claim 1, further comprising:
generating a new message comprising information related to the voice call; and
sending, to the first client device, the new message for display as part of the messaging conversation.

10. The method of claim 1, further comprising:
sending, to the first client device, a user name of a recipient corresponding to the end user device for display concurrent with the voice call.

11. The method of claim 1, wherein the second telephone number of the end user device is absent from the first request to place the voice call.

12. The method of claim 1, wherein the message of the messaging conversation uses one of a short messaging service (SMS) channel, a multimedia messaging service (MMS) channel, or an instant messaging service channel.

13. A system, comprising:
a memory; and
a processing device, coupled the memory, to perform operations comprising:
sending, by a software as a service (SaaS) platform and to an end user device, a message of a messaging conversation between the end user device and a first client device associated with a first user account of the SaaS platform, wherein:
the message is associated with a first telephone number provisioned by the SaaS platform,
the messaging conversation is associated with a messaging conversation identifier,
the end user device is associated with a second telephone number, and
the first client device is associated with a third telephone number;
receiving, via a first application programming interface (API) call from the first client device, a first request to place a voice call based on the messaging conversation identifier; and
responsive to receiving the first request, placing the voice call to the second telephone number, wherein the voice call is associated with the first telephone number provisioned by the SaaS platform and that is different than the third telephone number assigned to the first client device.

14. The system of claim 13, wherein the third telephone number assigned to the first client device is assigned by a carrier service.

15. The system of claim 13, the operations further comprising:
identifying, among a plurality of participants of the messaging conversation, a recipient of the voice call from the first client device based on filter criteria.

16. The system of claim 15, wherein identifying, among the plurality of participants of the messaging conversation, the recipient of the voice call from the first client device based on the filter criteria, comprises:
filtering, among the plurality of participants, any participants that are registered at the SaaS platform.

17. The system of claim 13, the operations further comprising:
determining that the first user account is authorized to place the voice call via the SaaS platform.

18. A non-transitory computer-readable medium comprising instructions that, responsive to execution by a processing device, cause the processing device to perform operations comprising:
sending, by a software as a service (SaaS) platform and to an end user device, a message of a messaging conversation between the end user device and a first client device associated with a first user account of the SaaS platform, wherein:
the message is associated with a first telephone number provisioned by the SaaS platform,
the messaging conversation is associated with a messaging conversation identifier,
the end user device is associated with a second telephone number, and the first client device is associated with a third telephone number;

receiving, via a first application programming interface (API) call from the first client device, a first request to place a voice call based on the messaging conversation identifier; and responsive to receiving the first request, placing the voice call to the second telephone number, wherein the voice call is associated with the first telephone number provisioned by the SaaS platform and that is different than the third telephone number assigned to the first client device.

19. The non-transitory computer-readable medium of claim 18, wherein the third telephone number assigned to the first client device is assigned by a carrier service.

20. The non-transitory computer-readable medium of claim 18, the operations further comprising:

identifying, among a plurality of participants of the messaging conversation, a recipient of the voice call from the first client device based on filter criteria.

* * * * *